July 5, 1938.  F. H. LAURILA  2,122,841
TIP-UP
Filed April 22, 1937
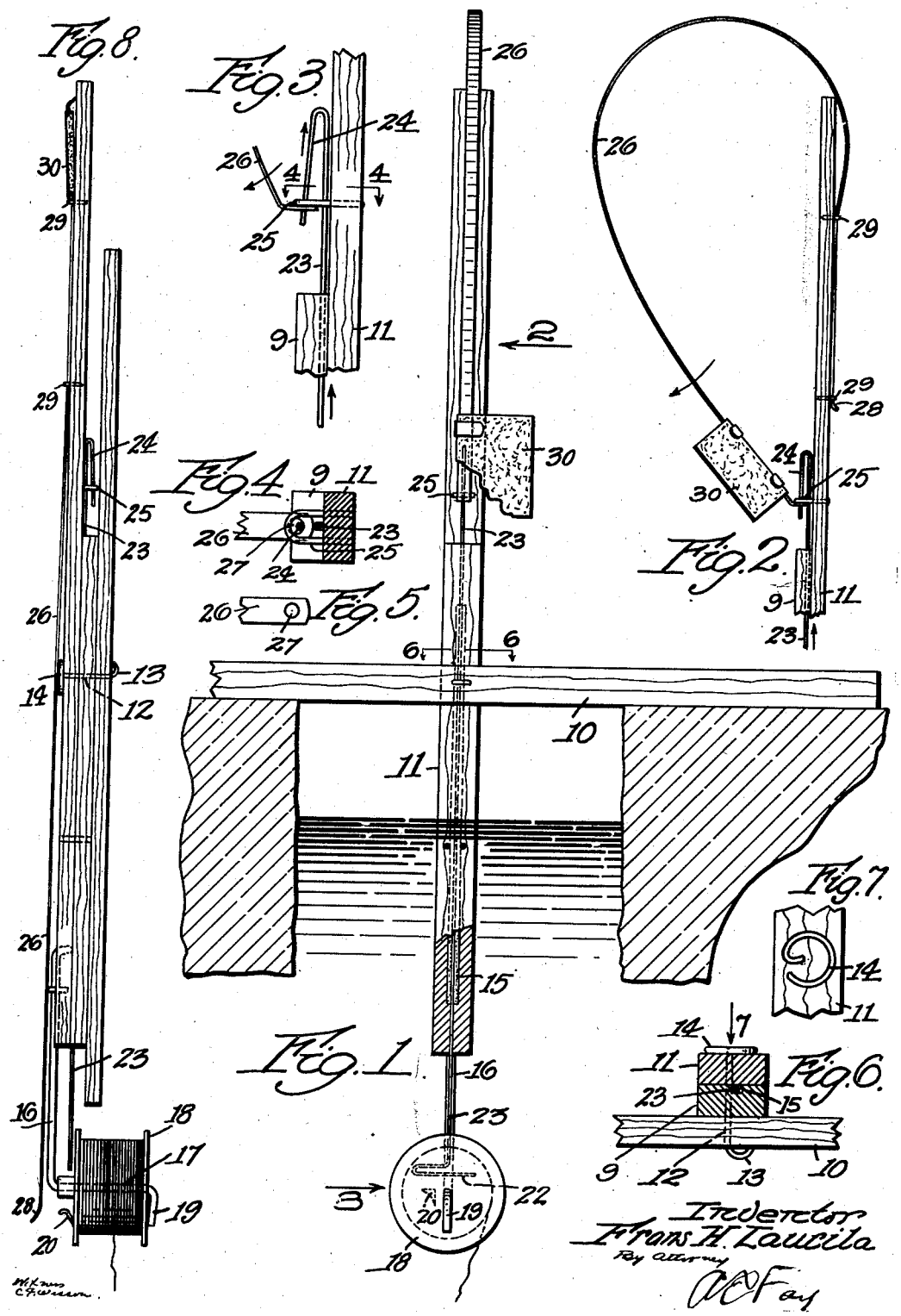

Patented July 5, 1938

2,122,841

UNITED STATES PATENT OFFICE 2,122,841

TIP-UP

Frans H. Laurila, Worcester, Mass.

Application April 22, 1937, Serial No. 138,429

5 Claims. (Cl. 43—16)

This invention relates to a tip-up for use in fishing through the ice.

The principal objects of the invention are to provide a construction in which a reel for the fishing line hangs down below the surface of the water where it will not freeze easily and will be in operative condition, if an inch or so of ice should form; to provide a construction in which the signal or flag is released by the operation of the reel itself; to provide an improved method of holding the signal down which is easily and accurately released on the turning of the reel; to provide an improved device for holding the two pivoted parts of the tip-up frictionally together to avoid turning of the same without the application of much force, and to provide improved means for preventing the freezing of the latch rod, which releases the signal, at a reduced expense of manufacture.

Other objects and advantages of the invention will appear hereinafter.

Reference is to be had to the accompanying drawing, in which

Fig. 1 is a side view of a preferred embodiment of this invention shown in its set condition with the flag or signal undisplayed;

Fig. 2 is a side view of a part of the device in that condition;

Fig. 3 is an enlarged view of the same;

Fig. 4 is a horizontal sectional view on the line 4—4 of Fig. 3 showing the staple through which the latch rod passes;

Fig. 5 is an end view of the spring member for holding the flag;

Fig. 6 is a sectional view on the line 6—6 of Fig. 1;

Fig. 7 is an elevation in the direction of the arrow 7 in Fig. 6, and

Fig. 8 is an edge view of the device folded up and brought into the smallest compass in condition for transportation.

This device is used in fishing through the ice. The tip-up is arranged to carry a reel, which will set the signal when a fish bites and starts to run. It has been customary to have the reel in the air outside the water so it will not freeze but the fish line goes under the water and, if there is any freezing, it would be caught stationary and held there. This invention relates to the type of tip-up in which the reel is located below the surface of the water and far enough below it so that with ordinary freezing it will not be prevented from its normal action when a fish bites. This involves the support of the reel from above and means for preventing the freezing of any element which passes upwardly from the reel to release the signal or flag.

In this case a bar 10 is arranged to rest on the ice. To this bar is pivotally connected a vertical bar 11, that is to say, this bar is vertical when the device is set and in operation. These two bars are intended to be folded up, as shown in Fig. 8, for transportation. A spring tension device is provided to connect them. In this case it is in the form of a pin 12 having its end 13 bent to hold it against the bar 10 and on the other end it is provided with an integral coil 14 which provides a high degree of friction to hold the two bars together so that they can be turned on their pivot but will not yield to slight forces. The bar 11 is made up of two pieces secured together by nails or the like and one of them 9 is provided with a passage 15 throughout the length of it. This passage is filled with grease so that a rod can be passed through it and water cannot enter it. Therefore, this groove with its grease constitutes a non-freezing feature.

At the bottom of the bar 11 is a vertical wire 16 secured to this bar and extending downwardly below it and having a horizontal portion 17 on which the fish line reel 18 is mounted to turn freely. The end of the stud 17 is bent down at 19 to limit the position of this reel. On the side of the reel there is a projection 20, preferably integrally mounted and having a hook at the end. This projection is located at a distance from the center. Upon the turning of the reel this projection will come in contact with a horizontal wire 22, which constitutes the bottom of a vertical rod 23, which extends up through the passage 15 to a point above the water. This rod is bent over at 24 into an inverted U-shape and both legs of this U project up through a staple 25 which is fixed to the bar 11 above the top of the member. When the device is set, this rod is projected to its lowest point which is where the wire 22 rests against or near the projection 20. It extends almost from one side of the reel to the other so that the projection 20 will always engage it and push it up, when the reel turns.

On the other side of the bar 11 is a flat spring wire 26 which, in a flat position, extends from the top of the bar 11 to the reel substantially. In its upper end it is provided with a perforation or eye 27 and its lower end with an outward bend 28. It passes under staples 29 on that side of the bar which constitute guides for it. It is provided preferably with a flag 30 at its top. It can be moved upwardly from the position shown in Fig. 8 to that shown in Fig. 1 and the bend 28 will engage the first staple and prevent its being moved further up. It is then flexed over, as shown in Fig. 2, until the eye 27 can be put through the end of the loop 24 below the staple 25, as shown in that figure. This holds the flag or other signal in the position shown. This is the set position of the tip-up.

Now, it will be obvious that, when a fish bites and starts to run, the reel will be unwound as usual and the first time the projection and hook 20 turns through the upper half of the revolution, the wire 22 and the rod 23 will be raised. This raises the loop 24 until its lower end passes above the staple 25. This necessarily releases the eye 27 and the spring 26 is free to swing upwardly. Its upper end will stay in such position as to display the signal so that it can be seen from a long distance. The tip-up is again set in the same way as before, ready for another catch after the fish has been released from the hook.

It will be seen that the device for releasing the signal is extremely simple and is operated directly by the reel under water; that although the upright 11 can be frozen into the water the device is still operative through the action of the rod 23 in the grease in the groove 15 and that it can be set and operated rapidly although firmly frozen into the ice. The two bars 10 and 11 are pivotally connected together by a spring connection which holds them frictionally in the proper position under ordinary circumstances but permits them to be folded up into small compass, as shown in Fig. 8. The whole device is simple, inexpensive to maintain in order and will operate perfectly when frozen into the ice.

Having thus described my invention and the advantages thereof I do not wish to be limited to the details herein disclosed, otherwise than as set forth in the claims, but what I claim is:

1. In a device for use in fishing through the ice, the combination of two bars pivoted together, a reel supported by one of them under water, a projection on the reel, a vertical wire in position to be raised by said projection when the reel rotates, said wire extending upwardly along one of said bars and having a downwardly extending end above water to hold a signal, whereby said end will be raised as the wire is raised, and a signal supported by the last named bar, the downwardly extending end serving as a catch for the signal, whereby the signal will be released when the reel is turned.

2. As an article of manufacture, a tip-up comprising a support, an upright carried by the support and extending under water and above the support, a staple extending into the upright, a wire movable vertically along the upright and having a loop at its top, the free end of which normally projects from above down through the staple, a flat spring carrying a signal and having a perforation in its end adapted to receive the projecting end of the wire, and means for raising the wire, when a fish is caught, to raise the projecting end enough to release the flat spring.

3. As an article of manufacture, a tip-up comprising a bar adapted to be set in an upright position, a member extending part way along the bar and secured thereto, said member having a groove along the side next to the bar packed with grease or the like, a wire extending through said groove, means below to raise the wire, and means above to display a signal when the wire is raised.

4. As an article of manufacture, a tip-up comprising a support, an upright carried by the support, a loop projecting from it, a wire movable vertically along the upright and having a loop at its top, the free end of which normally projects from above down through the first named loop, a spring carrying a signal and having means adapted to receive the projecting end of the wire, and means for raising the wire to raise the projecting end enough to release the spring.

5. In a device for use in fishing through the ice, the combination of two bars pivoted together, a reel supported by one of them, a projection on the reel, a horizontal wire in position to be raised by said projection when the reel rotates, said wire having a rod extending upwardly along one of said bars, a distorted flat spring wire having means for holding a signal, and means whereby the flat wire will be released through the rod when the reel is turned to display the signal.

FRANS H. LAURILA.